United States Patent [19]

Featherstone

[11] Patent Number: 4,765,913

[45] Date of Patent: Aug. 23, 1988

[54] PROCESS FOR REMOVING SILICA FROM SILICA-RICH GEOTHERMAL BRINE

[75] Inventor: John L. Featherstone, El Centro, Calif.

[73] Assignees: Union Oil Co. of Calif., Los Angeles; Mono Power Co., Rosemead; Southern Pacific Land Co., San Francisco, all of Calif.

[21] Appl. No.: 902,044

[22] Filed: Aug. 26, 1986

Related U.S. Application Data

[63] Continuation of Ser. No. 700,526, Feb. 11, 1986, abandoned.

[51] Int. Cl.$^4$ .............................................. C02F 1/52
[52] U.S. Cl. .................................. 210/714; 60/641.2; 60/641.5; 210/717; 210/724; 210/727; 210/747; 210/912
[58] Field of Search ........................... 60/641.2, 641.5; 210/713, 714, 717, 725, 727, 728, 734, 737, 747, 724, 912

[56] References Cited

U.S. PATENT DOCUMENTS

| | | | |
|---|---|---|---|
| 3,087,889 | 4/1963 | Goudriaan | 210/712 |
| 3,414,348 | 11/1968 | Goerg | 351/226 |
| 3,647,396 | 3/1972 | DeWittie et al. | 209/5 |
| 3,752,760 | 8/1973 | Gordon et al. | 210/701 |
| 3,932,224 | 1/1976 | Hirota et al. | 203/7 |
| 3,951,794 | 4/1976 | Swearingen | 210/170 |
| 4,016,075 | 4/1977 | Wilkins | 423/127 |
| 4,127,989 | 12/1978 | Mickelson | 60/641.2 |
| 4,209,395 | 6/1980 | Berlenbach et al. | 210/714 |
| 4,302,328 | 11/1981 | Van Note | 210/714 |
| 4,304,666 | 12/1981 | Van Note | 60/641.2 |
| 4,328,106 | 5/1982 | Harrar et al. | 210/700 |
| 4,370,858 | 2/1983 | Awerbuch et al. | 60/641.5 |
| 4,405,463 | 9/1983 | Jost et al. | 210/712 |
| 4,429,535 | 2/1984 | Featherstone | 210/714 |
| 4,522,728 | 6/1985 | Gallup et al. | 210/714 |

FOREIGN PATENT DOCUMENTS 648242 9/1962 Canada .

OTHER PUBLICATIONS

SPE 8269—Stabilization of Highly Saline Geothermal Brines.
Geothermal Research Council, vol. 3, Salinity Geosulfide Precipitation of Heavy Metals from High Thermal Brine.
(List continued on next page.)

Primary Examiner—Peter Hruskoci
Attorney, Agent, or Firm—Walter A. Hackler

[57] ABSTRACT

A process is provided for reducing the silica content in silica-rich geothermal brine having dissolved heavy metals, particularly from brine which is flashed from a high natural pressure to a reduced pressure to convert some of the brine into steam, the flashing causing the brine to become supersaturated in silica. The process comprises combining a base material with the brine, in the brine flashing stage, to increase the brine pH from its natural range of about 5 to 5.5 to a range of between about 6.2 and about 6.6, with a pH of about 6.4 being preferred. The added base, which is preferably selected from ammonia, sodium or calcium hydroxide and sodium sulfide or polysulfide, reacts with heavy metals, notably iron, copper and lead in the brine to form a finely divided, insoluble compound or compounds which function as seed crystals onto which supersaturated amounts of silica are precipitated from the brine. The base may be added to the brine in an amount of between about 200 and about 400 ppm by weight. A contact time between the brine and the immediately-formed seed crystals of between about 2 and about 10 minutes is provided, with about 6 to about 8 minutes being preferred to provide sufficient time for the silica to precipitate onto the seed crystals. Thereafter the silicious insoluble material is separated from the brine. If ammonia is used as the base, a flocculating agent, for example, a cationic polymer such as polyacrylamide, is added at a rate of about 1 ppm by weight to flocculate the insoluble silicious material and thereby facilitate separation thereof from the brine. The brine may thereafter be reinjected into the ground for disposal.

4 Claims, 2 Drawing Sheets

OTHER PUBLICATIONS

ECO FM 5170, Removal of Silica from Raft River Geothermal Water.

Report 8680—Operation of a Mineral Recovery Unit on Brine from The Salton Sea Known Geothermal Resource Area.

Geothermal Research Council, vol. 3—A Cost-Effective Treatment System for the Stabilization of Spent Geothermal Brines.

Economic Geology, vol. 6—Sulfides Associated with the Salton Sea Geothermal Brine.

PB 245 686—The Recovery and Separation of Mineral Values from Geothermal Brines.

PROCESS FOR REMOVING SILICA FROM SILICA-RICH GEOTHERMAL BRINE

This application is a continuation of application Ser. No. 700,526, filed Feb. 11, 1986, now abandoned.

BACKGROUND OF THE INVENTION

1. Field of the Invention

The present invention relates generally to the production of electric power by use of geothermal fluids and more particularly to processes for reducing the silica content of flashed, silica-rich geothermal brine by inducing crystallization of the silica from the brine onto seed crystals.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity. Thus, as an example, geothermal aquifers are fairly common along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has, instead, been directed to exploitation of geothermal resources for production of electrical power which can be conducted, often over existing power grids, for long distances from the geothermal sources. In particular, recent steep increases in the cost of petroleum products used for conventional production of electric power, as well as actual or threatened petroleum fuel shortages or embargos have intensified the interest in use of geothermal fluids as an alternative and generally self-renewing source of power plant "fuel".

General processes by which geothermal fluids can be used to generate electric power are known and have been known for some time. As an example, geothermal steam, after removal of particulate matter and polluting gases, such as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence. Cooler geothermal brine or water can often be used to advantage in binary systems in which a low-boiling point, secondary liquid is vaporized by the hot geothermal liquid, the vapor produced being used to operate gas turbine generators. The cooled brine is typically reinjected into the ground.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, by the late 1970's, geothermal steam at The Geysers in Northern California was generating about two percent of all the electricity used in California.

While energy production facilities at important geothermal steam sources, such as at The Geysers, are still being expanded, when not already at capacity, the known number of important geothermal steam aquifers is small compared to that of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric generating plants, much of this effort being expended towards use of vast geothermal brine resources in the Imperial Valley of southern California.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of flashed geothermal brine power plant development in many areas.

These severe problems are caused primarily by the typically complex composition of geothermal brines. At natural aquifer temperatures in excess of about 400° F. and pressures in the typical range of 400 to 500 psig, the brine leaches large amounts of salts, minerals and elements from the aquifer formation, the brine presumably being in chemical equilibrium with the formation. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As natural brine pressure and temperature are substantially reduced in power plant steam conversion (flashing) stages, chemical equilibrium of the brine is disturbed and saturation levels of impurities in the brine are typically exceeded. This causes the impurities and silica to precipitate from the brine, as a tough scale, onto surrounding equipment walls and in reinjection wells, often at a rate of several inches in thickness per month. Assuming, as is common, that the brine is saturated with silica at the wellhead, in high temperature portions of the brine handling system, for example, in the high pressure brine flashing vessels, heavy metal sulfide and silicate scaling typically predominates. In lower temperature portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations may, unless scale reducing processes are used, be required. Associated injection wells may also require frequent and extensive rework and new injection wells may, from time to time, have to be drilled at great cost.

Therefore, considerable effort has been, and is being, directed towards developing effective processes for eliminating, or at least very substantially reducing, silica scaling in flashed geothermal brine handling systems. One such scale reduction disclosed in U.S. Pat. No. 4,370,858 to Awerbuch, et al, involves the induced precipitation of scale-forming materials, notably silica, from the brine in the flashing stage by contacting the flashed brine with silica or silica-rich seed crystals. When the silica saturation level in the brine is exceeded by the brine being flashed to a reduced pressure, supersaturation amounts of the silica leaving solution in the brine deposit onto the seed crystals. Not only do the vast number of micron-sized seed crystals introduced into the flashing stage provide a very much larger surface area than the exposed surfaces of the flashing vessels but the silica from the brine tends to preferentially deposit onto the seed crystals. Substantially all of the silica supersaturation, therefore, precipitates onto the seed crystals instead of precipitating as scale onto vessel and equipment walls and in injection wells.

Preferably, the seed crystals are introduced into the high pressure flashing vessel, which may then be referred to as a high pressure flash crystallizer, wherein the brine first becomes supersaturated in scale-forming materials. The crystallization process, while starting in the high pressure flash crystallizer, continues in successive, lower pressure flashing vessels in which the brine typically again becomes supersaturated with silica. In a downstream reactor-clarifier, the silicious precipitate is separated from the brine as a slurry which contains about 30 percent by weight of silica. According to known processes, a portion of this silicious slurry from the reactor-clarifier stage is recirculated back upstream into the high pressure flash crystallizer, whereby the silica material in the slurry acts as seed material.

After subsequent filtering to remove fine silicious particles not removed in the reactor-clarifier stage, the "clarified" brine is commonly reinjected into the ground in an injection stage.

As above-mentioned, geothermal brines used for electric power generation are, at wellhead temperature and pressure, frequently saturated with silica. As a consequence, substantial amounts of silica must be precipitated from the brine onto the seed material in the flash crystallization stage in order to prevent silica scaling in downstream brine handling equipment. Such removal of silica from the geothermal brine requires, particularly for high brine flow rates associated with production of reasonably large amounts of power, effective and rapid silica precipitation so that brine residence time in the flash crystallizer vessels, as determined by vessel capacity, can be maintained within acceptable and practical limits.

Such known silica seeding processes which use the silicious slurry from reactor-clarifier stage as seed material have, however, substantial disadvantages. A major disadvantage is that because of the large volume of seed material required for rapid, effective silica precipitation and because of the lower temperature of the seed slurry compared with that of the main flow of brine into which the slurry is introduced, steam production in the flash crystallizer is significantly reduced by quenching action of the slurry. The amount of steam "lost" as a result of such quenching may be about 5 percent. For an exemplary 10 megawatt power plant a 5 percent steam loss is equivalent to about 0.5 megawatts power loss, having a current value of about $33 an hour or about a quarter of a million dollars for a typical, 10 month operational year. Another disadvantage is that substantial costs are associated with the purchase, installation, operation and maintenance of the pipes, fittings and relatively large pumps required for pumping the seed slurry from the reactor-clarifier stage upstream to the high pressure flash crystallizer.

It is therefore, an object of the present invention to provide a process for removing silica from flashed geothermal brine by in-situ seed material formation in the flash crystallization stage of a geothermal brine handling system.

Another object of the present invention is to provide a process for removing silica from flashed geothermal brine by in-situ seed material formation in the flash crystallization stage of a geothermal brine handling system by reacting a base with naturally present heavy metals dissolved in the flashed brine so as to form insoluble heavy metal compounds which function as seed material.

Other objects, advantages and features of the present invention will become apparent to those skilled in the art from the following description, when taken in conjunction with the accompanying drawing.

SUMMARY OF THE INVENTION

According to the present invention, a process is provided for simultaneously producing steam and preventing scale formation in a flash vessel by removing supersaturated amounts of silica from flashed, silica-rich geothermal brine by in-situ formation of seed material onto which the supersaturation amounts of silica can precipitate or deposit. The process is particularly useful in a system for handling a flow of hot, naturally-pressurized, highly saline geothermal brine containing disolved heavy metals, for example, lead, copper, and iron, as well as large amounts of silica, and having a natural pH of between about 5 and about 6, the system including a flashing stage comprising at least one flashing vessel in which the brine is flashed to a substantially reduced pressure to convert some of the brine into steam, the brine becoming thereby supersaturated in silica. The silica removal process of the present invention includes combining with the geothermal brine in the flashing stage an amount of base which increases the pH of the brine-base mixture to between about 6.2 and about 6.6. An amount of base is more preferably used which increases the pH of the mixture to about 6.4. The added base reacts with at least some of the heavy metals, notably iron and/or lead, naturally contained in the brine to form finely divided, relatively insoluble heavy metal compounds which precipitate from the brine and form seed material onto which the supersaturated amounts of silica precipitates or deposits. The present process includes contacting the brine in the flashing stage with the formed seed material for a length of time enabling substantially all of the silica supersaturation to precipitate or deposit onto the seed material, the resulting material being then separated from the brine.

Preferably, the base is selected from a group of bases consisting of ammonia, sodium hydroxide, calcium hydroxide, sodium sulfide and sodium polysulfide, ammonia being, however, the most preferred base. When ammonia is used, the base process preferably further includes combining with the brine and base mixture a flocculating agent so as to enhance flocculation of the insoluble silicious material formed by contacting the brine with ammonia. Preferably, about 1 ppm by weight of flocculating agent is used and the flocculating agent may comprise a cationic polymer.

A flashed brine-seed material contacting time in the flashing stage of between about 2 and about 10 minutes is preferable, being provided by the stage having a volume of between about 2 and about 10 times the per-minute flow rate of brine flow into the vessel. More preferably, a contacting time of between about 6 and about 8 minutes is provided.

The amount of base combined with the brine may be between about 50 ppm and about 1000 ppm by weight and is preferably between about 200 ppm and about 400 ppm by weight.

BRIEF DESCRIPTION OF THE DRAWING

The present invention will be more readily understood by reference to the drawing which is a simplified diagram of an exemplary geothermal brine power plant in which the present invention may be used to advantage, Figure 1a showing part of the power plant and Figure 1b showing the remainder of the power plant.

DESCRIPTION OF THE PREFERRED EMBODIMENT

Figure 1A:
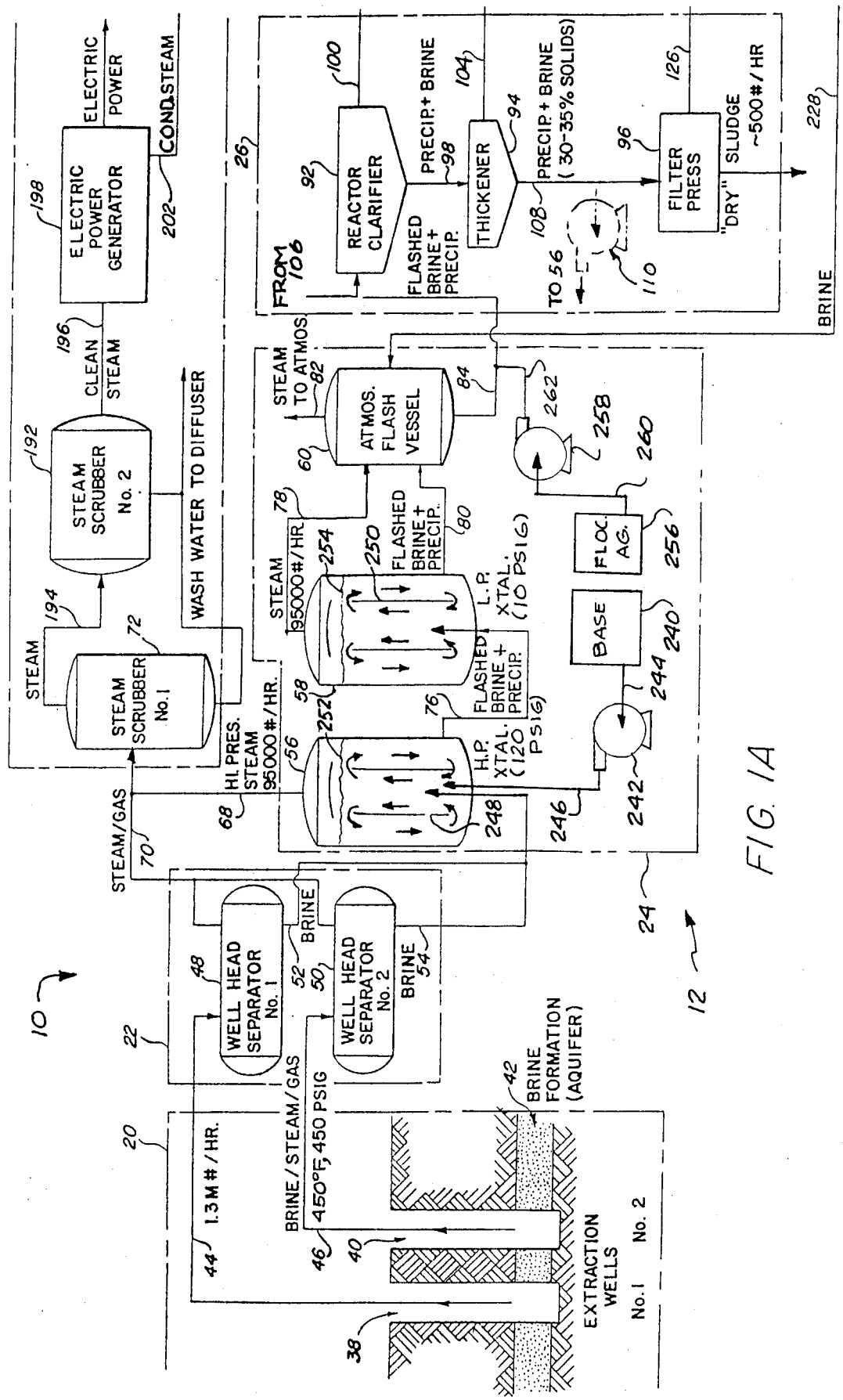

The present process for reducing the silica content of flashed geothermal brine, by providing in-situ seed material formation, can be better understood by the consideration of an exemplary geothermal brine power plant with which such process may be used to advantage. Shown, therefore, in simplified form in FIG. 1 is an exemplary, geothermal brine power plant 10 which comprises generally a brine handling portion 12 and an electric power generating portion 14.

As more particularly described below, the function of brine handling portion 12 is to extract hot pressurized geothermal brine from the ground; to convert, by a flashing process, part of the brine to steam for use by power generating portion 14; to control silica removal from the flashed brine and to reinject into the ground the flashed brine and steam condensate (if any) returned from the power generating portion. To this end, brine handling portion 12 comprises generally a brine extraction stage 20, a wellhead separation stage 22, a steam production (flashing) and silica crystallization stage 24 in which the present invention is practiced, a brine clarification stage 26, a brine filtering stage 28 and a brine reinjection stage 30. The function of power generating portion 14, in turn, is to use steam from brine handling portion 12 for the production of electric power.

More specifically, brine extracting stage 20, as shown in FIG. 1a, includes first and second geothermal brine extraction wells 38 and 40, by means of which geothermal brine is extracted from a common underground aquifer 42. The geothermal brine may, as measured at the wellhead, have a natural temperature of about 450° F. and be at a natural pressure of about 450 psig. At the mentioned high temperature and pressure, the geothermal brine dissolves substantial amounts of minerals and elements from aquifer formation 42. In particular, the brine normally contains considerable dissolved salts (hence, the termination "brine") and is typically saturated or nearly saturated with silica. Moreover, the brine may contain appreciable amounts of dissolved heavy metals, including lead, zinc, copper, iron and cadmium. Gases such as hydrogen sulfide, ammonia and carbon dioxide may be intermixed with the brine. The brine thus comprises heavily contaminated water and may typically have a natural pH of about 5 to 5.5, being thereby slightly acidic.

From wells 38 and 40, the brine is fed, through conduits 44 and 46, to respective first and second wellhead separators 48 and 50 which comprise separator stage 22. In wellhead separators 48 and 50 geothermal steam mixed with the brine and such non-condensable gases as hydrogen sulfide and ammonia, which are mixed with the brine are separated from the brine.

From wellhead separators 48 and 50, the brine is fed through conduits 52 and 54 into the bottom of a high pressure flash crystallizer 56 which, as shown, together with a low-pressure flash crystallizer 58 and an atmospheric flash vessel 60 comprise steam production (flashing) and silica crystallization stage 24. In high pressure flash crystallizer 56 the brine is flashed to a reduced pressure of, for example, about 120 psig so as to convert part of the brine into steam. For example, for an exemplary flow of about 1.3 million pounds of 450° F. and 450 psig brine per hour into high pressure flash crystallizer 56, about 95,000 pounds of 120 psig steam may be produced. Such steam is discharged through a conduit 68 which joins a common steam/gas discharge conduit 70 from wellhead separators 48 and 50. Conduits 68 and 70 discharge into a first steam scrubber 72 of power generating portion 14.

As more particularly described below, within steam production and silica crystallization stage 24 silica in the brine, which typically becomes supersaturated in silica as a result of the flashed operation, is caused to crystallize or deposit onto in-situ formed seed material. As a result of the silica supersaturation being removed from the brine in such a manner, formation of silica scale on downstream equipment is prevented or at least very substantially reduced.

From high pressure flash crystallizer 56, brine and suspended silicious particles formed in the in-situ seeding and silica precipitation process are flowed through a conduit 76 into the bottom of low pressure flash crystallizer 58 wherein the brine is again flashed to a reduced pressure of, for example, about 10 psig. In this second flashing step, in which additional brine is converted to steam, the saturation level of silica in the brine may again be exceeded, and additional supersaturation amounts of silica precipitate onto the already-formed silicious particles in the brine. For the exemplary brine flow rate mentioned above, the amount of steam produced in low pressure flash crystallizer 58 may also be about 95,000 pounds per hour. Such additionally produced steam which has relatively low energy content, may be used for auxilliary heating or the like, or, as shown, may be discharged from low pressure crystallizer 58, through a conduit 78, into atmospheric flash vessel 60. From crystallizer 58, brine and the suspended silicious particles are flowed through conduit 80 to atmospheric flash vessel 60.

In atmospheric flash vessel 60, the brine is again flashed, this time, to atmospheric pressure, releasing still more steam and causing the brine to once more become supersaturated in silica. Such additional, atmospheric steam may be discharged, through a conduit 82, into the atmosphere or may alternatively be used for heating or like purposes. Silica precipitation from the brine onto the already formed silicious particles continues in atmospheric flash vessel 60. Brine and suspended silica particles are discharged from vessel 60, through a conduit 84, to a recirculating-type, reactor-clarifier 92 which, together with a thickener 94 and a filter press 96, comprise brine clarification stage 26.

Figure 1B:
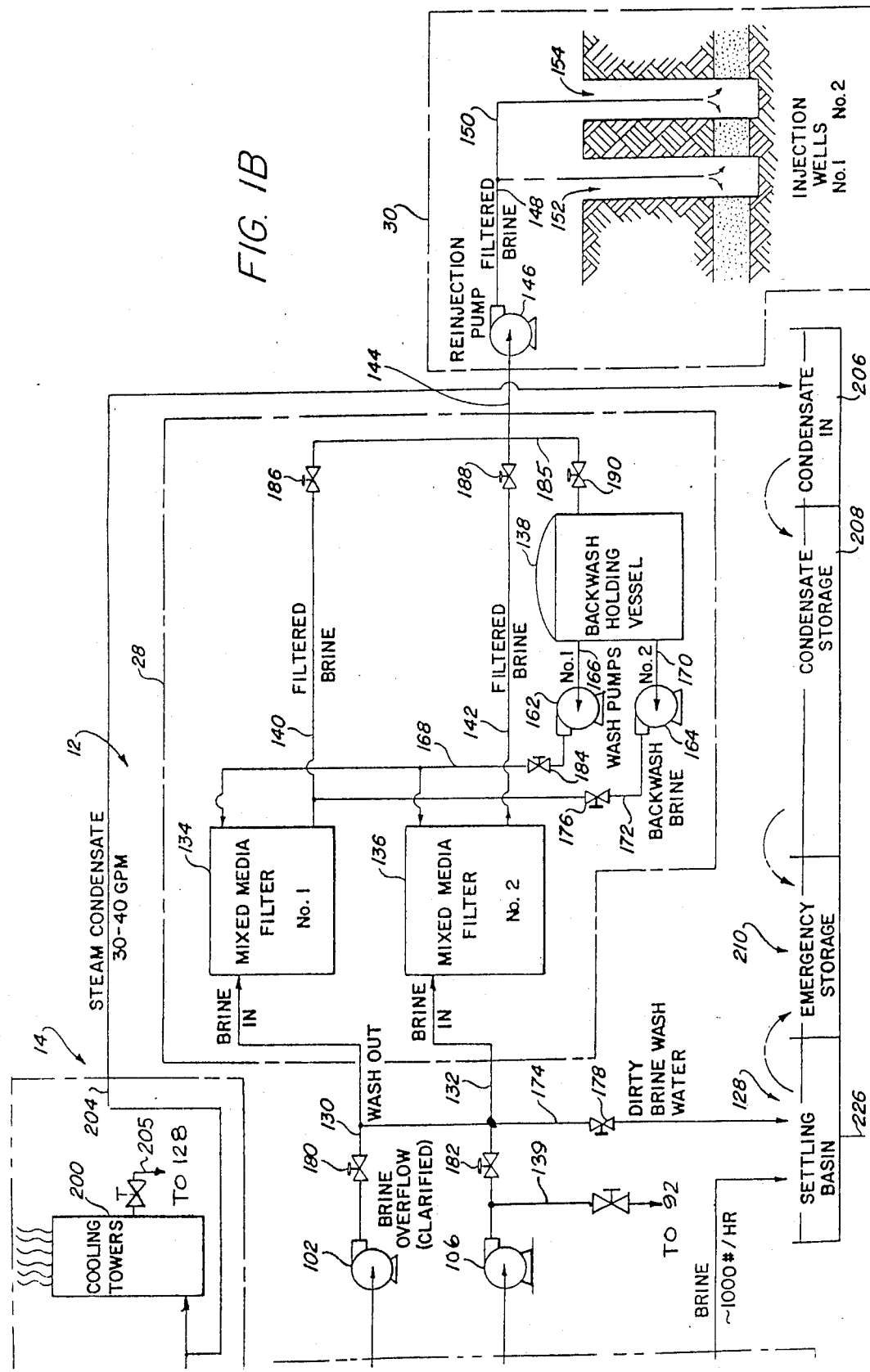

Within reactor-clarifier 92, most of the upstream formed silicious particles are settled from the brine as a sludge which is then discharged, with some brine, as a slurry from the bottom of the reactor-clarifier through a conduit 98. Clarified brine, still, however, containing some very fine silicious particulate matter in suspension, is discharged from reactor-clarifier 92 through a conduit 100 to a first pump 102 (FIG. 1b). The slurry of silicious sludge and brine is delivered, through conduit 98, to sludge thickener 94, in which much of the brine is removed from the sludge, such brine being discharged from the thickener through a conduit 104 to a second pump 106 (FIG. 1b).

From thickener 94, a thickened slurry of brine containing about 30–35 weight percent of insoluble silicious material (sludge) and having a temperature of about 220° F., is discharged, through a conduit 108, to filter press 96. In accordance with known, conventional silica seeding processes, a slurry pump 110 (shown in phantom lines) would typically be connected between conduit 108 and high pressure flash crystallizer 56 to enable pumping part of the brine-sludge slurry discharged from thickener 94 upstream into such flash crystallizer so that the sludge could be used as seed material.

Brine is discharged from filter press 96 through a conduit 126 to a settling basin 128 (FIG. 1b). "Dry" sludge may, for the mentioned brine flow rate of about 1.3 million pounds per hour, be discharged from filter press 96 at a rate of about 500 pounds per hour (dry weight) for disposal or use.

Brine pumps 102 and 106 pump brine from reactor-clarifier 92 and thickener 94, through respective conduits 130 and 132, into first and second media filters 134 and 136 which, with backwash holding vessel 138, principally comprise brine filtering stage 28 (FIG. 1b). Alternatively, pump 106 may pump brine from thickener 94, through a conduit 139, back to the inlet of reactor-clarifier 92. From filters 134 and 136 filtered brine is flowed, through respective conduits 140 and 142 and common conduit 144 to a reinjection pump 146. From pump 146, the filtered brine is discharged, through conduits 148 and 150, into first and second injection wells 152 and 154, respectively, with pump 146 and such wells comprising reinjection stage 30.

Included in filtering stage 28, are first and second backwash pumps 162 and 164 which are connected between holding vessel 138 and filters 134 and 136 by conduits 166, 168, 170 and 172, as shown in FIG. 1b. A backwash dirty brine conduit 174 is connected between conduits 130 and 132 and setting basin 128. Various valves 176, 178, 180, 182 and 184 control backwash water flow. Filtered brine for backwashing filters 134 and 136 is obtained from conduits 140 and 142 by a conduit 185; valves 186, 188 and 190 control flow of brine from filters 134 and 136 into pump 146 and holding vessel 138.

In power generating portion 14, steam is flowed from first steam scrubber 72 (FIG. 1a) to a second steam scrubber 192 through a conduit 194. From second scrubber 192, clean steam is fed through conduit 196 to turbine generator 198. Condensed steam is discharged from generator 198 to a cooling tower 200 (FIG. 1b) through a conduit 202. Excess steam condensate not required by tower 200, at a rate, for example, of about 30–40 gallons per minute, is fed through a conduit 204 back to a "condensate in" tank 206. From tank 206 the condensate overflows into a condensate storage tank 208. Cooling tower blowdown from tower 200 is discharged through conduit 205 to settling basin 128. An emergency overflow storage pond 210 is in overflow communication between condensate storage tank 208 and brine setting basin 128. Typically brine from setting basin 128 is pumped by a brine pump 224, through conduits 226 and 228, back to atmospheric flash vessel 60 for combining therein with brine from low pressure flash crystallizer 58.

It is to be understood that power plant 10 is shown in FIG. 1 merely by way of example and, as such, has been shown somewhat simplified over an actual power plant which has a great many valves, conduits, controls and the like not shown or described. Also, for example, an actual geothermal brine power plant may have more than the two extraction wells 38 and 40, the separators 48 and 50, the two filters 134 and 136 and the two injection wells 152 and 154 shown.

SILICA SEEDING PROCESS (FIGURE 1a)

Problems associated with use of silica sludge from reactor-clarifier stage 26 as seed material in high pressure flash crystallizer 50 are eliminated in the present silica removal process by forming the seed material in the high pressure flash crystallizer. However, for such an in-situ seed formation step to be cost effective, the rate of seed formation should be compatible with the brine residence time in the high pressure flash crystallizer and production of either too little or too much seed material should be avoided. If, for example, too little seed material is formed, excessive silica deposition onto vessel and equipment walls may occur and scaling problems may result. On the other hand, if an excessive amount of seed material is formed, reactor-clarifier 42 may be overloaded and the brine clarification process may be upset. Moreover, the cost of silica sludge disposal may be greatly increased due to added sludge production. In any event, for the process to be practical, costs associated with the present in-situ seed formation process should be less than or at least no greater than those associated with the known sludge recycling seed process described above.

To help achieve cost effectiveness, the in-situ seed formation, according to the present process, takes advantage of normal composition of geothermal brines by using heavy metals commonly found in the brine to form insoluble compounds which function as seed material. Iron, in the form of ferrous ions ($Fe^{2+}$), is for example, often present in geothermal brines in concentrations of 10,000 or more parts per million (ppm), lead, in the form of lead ions ($Pb^{2+}$), may be present in concentrations of several thousand ppm, and copper most probably in the form of cuprous ions ($Cu^+$), and may be present in concentrations of several hundred ppm. Iron, lead and copper typically present in the brine as soluble chloride compounds, are known to readily form insoluble hydroxides and/or sulfide precipitates.

In the present in-situ seed formation process, the flow of geothermal brine through high pressure flash crystallizer 56 (or an equivalent) flash crystallizer stage is contacted with amounts of base material, preferably of the hydroxide and/or sulfide type, causing formation of relatively insoluble compounds, for example, ferrous hydroxide, ferrous oxyhydroxide and/or lead sulfide. Such compounds rapidly form a vast number of micron-size particles collectively having a very great surface area and which effectively function as seed crystals onto which supersaturated amounts of silica, typically in the form of silicic acid ($H_4SiO_4$), crystallize or deposit from the brine. It should be noted that by insoluble compounds it is meant compounds which do not dissolve in the brine to any significant amount within the brine flow time between base addition in flash crystallizer 56 and brine reinjection in injection stage 30; although, given a much longer time, these compounds would probably dissolve in the brine. Bases which may be used to advantage in forming such insoluble heavy metal compounds include ammonia, sodium hydroxide, calcium hydroxide, sodium sulfide and sodium polysulfide.

Typical chemical reactions involved in the formation of the heavy metal hydroxides and sulfides are as follows:

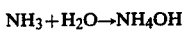

$$NH_3 + H_2O \rightarrow NH_4OH \quad (1)$$

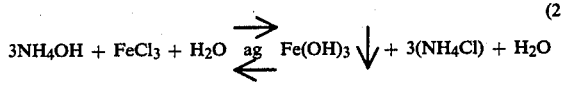

$$3NH_4OH + FeCl_3 + H_2O \rightleftharpoons Fe(OH)_3 \downarrow + 3(NH_4Cl) + H_2O \quad (2)$$

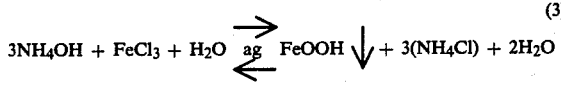

$$3NH_4OH + FeCl_3 + H_2O \rightleftharpoons FeOOH \downarrow + 3(NH_4Cl) + 2H_2O \quad (3)$$

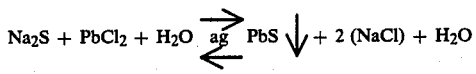

$$Na_2S + PbCl_2 + H_2O \rightleftharpoons PbS \downarrow + 2(NaCl) + H_2O \quad (4)$$

$$Na_2S + H_2O \rightleftharpoons NaHS + NaOH \quad (5)$$

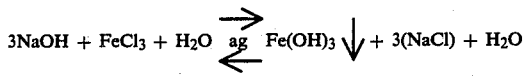

$$3NaOH + FeCl_3 + H_2O \rightleftharpoons Fe(OH)_3 \downarrow + 3(NaCl) + H_2O \quad (6)$$

Typical reactions associated with silica precipitation onto the heavy metal hydroxides and sulfides are considered to be as follows:

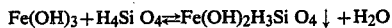

$$Fe(OH)_3 + H_4SiO_4 \rightleftharpoons Fe(OH)_2H_3SiO_4 \downarrow + H_2O \quad (7)$$

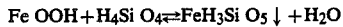

$$FeOOH + H_4SiO_4 \rightleftharpoons FeH_3SiO_5 \downarrow + H_2O \quad (8)$$

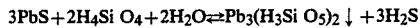

$$3PbS + 2H_4SiO_4 + 2H_2O \rightleftharpoons Pb_3(H_3SiO_5)_2 \downarrow + 3H_2S \quad (9)$$

It can be seen from Equations (7)–(9) that the heavy metal compounds obtained by contacting the flashed brine with a base form a metal-silica complex having a weak metal-to-silica bond. Copper undergoes reactions analogous to iron and lead in equations (7)–(9). As a result, silica tends to precipitate from the brine onto the seed material in preference to precipitating, as scale, onto equipment walls. Thus, in combination, the large surface area and the chemical attraction provided by the seed compounds are very effective in removing supersaturated amounts of silica from the flashed brine.

Formation of the insoluble heavy metal hydroxides and/or sulfides, and hence the silica crystallization rate, can, it has now been found, be effectively controlled by adjusting the pH of the flashed brine in high pressure flash crystallizer 56. The natural pH of flashed brine flowing into high pressure flash crystallizer is usually somewhere between about 5 and about 6 and is typically between about 5.5 and about 6. Rapid, effective heavy metal seed formation of the above-described type has now been determined to occur when base is added to the flashed brine in high pressure flash crystallizer 56 in an amount raising the brine pH to between about 6.2 and about 6.6, and preferably to about 6.4. In order to raise the flashed brine pH to the approximate 6.2–6.6 range, between about 50 ppm and about 1000 ppm by weight of base is ordinarily required depending upon brine pH and composition. In this regard, it should be noted that geothermal brines typically contain buffering materials, such as silica, which affect the rate at which brine pH can be changed and the amount of base required to change pH. Normally, however, between about 200 ppm and about 400 ppm by weight of base, (for example, about 300 ppm by weight of ammonia) is typically needed to raise brine pH to the preferred level of about 6.4. Elevating brine pH to the mentioned range of between about 6.2 and about 6.6 has been found to create about a two weight percent of heavy metal seed material in high pressure flash crystallizer 56, as is particularly desirable for rapid, effective silica removal from the brine.

For the approximate 6.2–6.6 pH level of flashed brine, a corresponding brine residence time in high pressure flash crystallizer 56 of between about 2 and about 10 minutes has been found to be highly desirable. A brine residence time of between 6 and about 8 minutes is, however, preferred. It has further been observed that after combining with the brine the base necessary to raise the brine pH to the preferred level, a suspension of heavy metal particles of about 1–2 micron seed size are formed within only a few seconds. After about four minutes of contact time with the brine, the size of such seed particles has been observed to have increased to between about 5 and about 10 microns due to silica precipitation onto the particles.

Although the insoluble, heavy metal seed particles are formed and silica precipitation onto the seed particles starts in high pressure flash crystallizer 56, silica precipitation onto the particles continues in low pressure flash crystallizer 58 as the silica saturation level is again exceeded in the subsequent brine flashing step. The brine residence time in low pressure flash crystallizer 58 is preferably about equal to the brine residence time in high pressure flash crystallizer 56. Still further silica precipitation occurs in atmospheric flash vessel 60, wherein brine discharged from low pressure flash crystallizer 58 is flashed to ambient pressure. As a result of such flashing, the silica saturation level in the brine may again be exceeded and the new supersaturation amounts of silica precipitate onto the particles formed around the seed material.

In practicing the present invention, it has been observed that use of sodium polysulfide as the base which is added to the flashed brine to produce in-situ seed material results in well flocculated silicious particles which have excellent settling properties. Therefore, the advantage of using sodium polysulfide is that the resulting silicious material is readily separated from the brine in reactor-clarifier 92 and only small amounts of fine, suspended material are carried along with the brine into filters 134 and 136. In consequence, the loading on filters 134 and 136 is relatively low and minimal filter servicing is required.

In contrast, use of ammonia for in-situ seed formation, which use is preferred because of relatively low cost and good availability of ammonia, tends to result in a suspension of silicious particles which is typically not well flocculated. As a result, separation of the silicious particles from the brine in reactor-clarifier 92 tends to be difficult and excessive amounts of non-flocculated material may remain suspended in brine discharged from the reactor-clarifier into filters 134 and 136. When ammonia is used for in-situ seed formation, it is thus preferable also to add a flocculating agent to the flashed brine. Preferably, such flocculating agent is added directly into conduit 84 which discharges brine from atomspheric flash vessel 60, so as to mix with the flow of brine and suspended silicious material into reactor-clarifier 92. Addition of only a relatively small amount, for example, about 1 ppm by weight, of flocculating agent has been found to increase the particle size of the silicious material from about 6–7 microns to a size range of about 12–14 microns which enables separation in reactor-clarifier 92. Cationic polymers, such as polyacrylamide, may be used as the flocculating agent.

As shown in FIG. 1a, the base material is preferably introduced into the bottom of high pressure flash crystallizer 56 from a base supply tank 240. A pump 242 is connected, by conduits 244 and 246 between supply tank 240 and flash crystallizer 56. Also, as shown, high pressure flash crystallizer 56 is formed having an upright, tubular baffle 248 into which both brine from conduits 52 and 54 and base from conduit 246 is discharged. Baffle 248 enables substantial recirculation of the brine and base, and hence of the brine and seed material, within such flash crystallizer. A similar baffle 250 is provided in low pressure flash crystallizer 58. Upper ends of both baffles 248 and 250 are below corresponding brine surfaces 252 and 254 in flash crystallizers 56 and 58.

A supply tank 256 is provided for storing a flocculating agent, assuming such an agent is, in fact used. A flocculating agent pump 258 is connected by conduits 260 and 262 between supply tank 256 and conduit 84.

Although the preferred embodiment of the present invention has been described, it will, of course, be understood that the invention is not limited thereto, since many obvious modifications can be made by those skilled in the art, and it is intended to include within this invention as fall within the scope of the appended claims.

What is claimed is:

1. A process for simultaneously producing steam and flocculated silica particles in a flash vessel from geothermal brine and preventing silica scale formation by in-situ seed formation in a system for handling a flow of hot, naturally pressurized and highly-saline geothermal brine containing dissolved heavy metals and large amounts of dissolved silica and having a natural pH of less than about 6, the system including a high pressure flash vessel in which the geothermal brine is flashed to a substantially reduced pressure to convert a portion of the geothermal brine into steam, while a remaining portion of the geothermal brine becomes supersaturated in silica, the process comprising:
   (a) reducing the pressure in the flash vessel to produce steam and combining with the geothermal brine in the high pressure flash vessel an amount of sodium polysulfide, to form a brine-base mixture having a pH between about 6.2 and about 6.6, said sodium polysulfide reacting with at least some of the heavy metals in the geothermal brine to form seed crystals comprising finely divided, insoluble heavy metal compounds capable of precipitating and flocculating silica particles;
   (b) maintaining the geothermal brine in the high pressure flash vessel with said seed crystals for between about 2 and about 10 minutes to form a suspension of flocculated silicious material in said brine-base mixture, said flocculated silicious material comprising seed crystals having silica precipitation thereon, the silica precipitated on the seed crystals being prevented from depositing as scale in said flash vessel; and
   (c) separating said silicious material from the brine-base mixture.

2. The process as claimed in claim 1 wherein an amount of said sodium polysulfide is combined with the geothermal brine to cause the pH of the mixture to be about 6.4.

3. The process as claimed in claim 1 wherein the amount of said sodium polysulfide combined with the geothermal brine is between about 200 ppm and about 400 ppm by weight.

4. The process as claimed in claim 1 wherein the geothermal brine is maintained in the flash vessel with the seed crystals between about 6 and about 8 minutes.

* * * * *